United States Patent [19]

Hageman et al.

[11] 4,411,823
[45] Oct. 25, 1983

[54] INITIATOR SYSTEM FOR RADIATION CURABLE COMPOSITIONS, RADIATION CURABLE COMPOSITIONS CONTAINING SUCH AN INITIATOR SYSTEM, A PROCESS FOR CURING SAID COMPOSITIONS AND PRODUCTS COVERED THEREWITH

[75] Inventors: Hendrik J. Hageman, Rozendaal; Willem J. de Klein, Dieren; Egenius A. Giezen, Rheden, all of Netherlands

[73] Assignee: Akzo N.V., Arnhem, Netherlands

[21] Appl. No.: 246,424

[22] Filed: Mar. 23, 1981

[30] Foreign Application Priority Data

Mar. 31, 1980 [NL] Netherlands ......................... 8001885

[51] Int. Cl.$^3$ .......................... B01J 31/02; B01J 31/04
[52] U.S. Cl. ..................................... 502/168; 430/17; 430/284; 430/285; 430/286
[58] Field of Search ............... 252/426, 431 R, 431 C, 252/431 P

[56] References Cited

U.S. PATENT DOCUMENTS

| 2,448,828 | 9/1948 | Renfrew | 252/426 X |
| 2,647,080 | 7/1953 | Joyce | 252/426 X |
| 3,222,429 | 12/1965 | Boyd et al. | 252/426 X |
| 3,933,682 | 1/1976 | Bean | 252/431 R |
| 4,017,652 | 4/1977 | Gruber | 252/426 X |
| 4,077,858 | 3/1978 | Costanza et al. | 204/159.23 |
| 4,207,156 | 6/1980 | Collins et al. | 204/159.24 |

FOREIGN PATENT DOCUMENTS 906142 2/1960 United Kingdom .
536459 4/1977 U.S.S.R. .

OTHER PUBLICATIONS

Chemical Abstracts; vol. 86, 1977, p. 626, 81719s.
Encyclopedia of Chemical Technology, vol. 13, (Third Edition) pp. 367–371.

Primary Examiner—Patrick Garvin
Attorney, Agent, or Firm—Stevens, Davis, Miller & Mosher

[57] ABSTRACT

A new initiator system for radiation curable compositions is disclosed.

In said system there are incorporated:
(a) a compound of the formula:

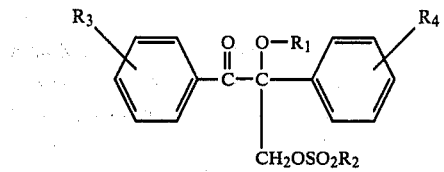

where $R_1$=H or a substituted or unsubstituted alkyl group having 1 to 18 carbon atoms, an alkenyl group having 2 to 18 carbon atoms, a cycloalkyl or cycloalkenyl group having 5 to 8 carbon atoms, a substituted or unsubstituted aryl group having 6 to 20 carbon atoms, a furfuryl group or the group

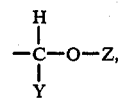

where Y represents a methyl group and Z an alkyl group having 2 to 4 carbon atoms or Y and Z together form a 1,3- or 1,4- alkylene group having 3 or 4 carbon atoms which is substituted or not with an alkoxy group having 1 to 4 carbon atoms; $R_2$=a substituted or unsubstituted alkyl group or alkenyl group having 4 to 20 carbon atoms, a cycloalkyl group or cycloalkenyl group having 5 to 8 carbon atoms, an alkaryl group having 4 to 16 carbon atoms in the alkyl group or a furfuryl group; $R_3$ and $R_4$ may be the same or different and represent a hydrogen, a chlorine or a bromine atom or a phenyl group, a substituted or unsubstituted alkyl group or alkoxy group having 1 to 4 carbon atoms, or a dialkyl amino group of which the alkyl groups have 1 to 4 carbon atoms and may be substituted with a hydroxyl group, and
(b) a synergistic amount of a Na, K and/or Li-salt of an organic acid that is compatible with the curable compositions; and optionally some amount of solvent c for component b.

The initiator system cures rapidly and has good storage stability.

10 Claims, No Drawings

INITIATOR SYSTEM FOR RADIATION CURABLE COMPOSITIONS, RADIATION CURABLE COMPOSITIONS CONTAINING SUCH AN INITIATOR SYSTEM, A PROCESS FOR CURING SAID COMPOSITIONS AND PRODUCTS COVERED THEREWITH

The invention relates to an initiator system for radiation curable compositions, to radiation curable compositions in which such a system is incorporated, and to a process for curing compositions containing said initiator system, and to products entirely or partly covered with a composition cured by said process.

Initiator systems for curing unsaturated monomers or mixtures thereof with unsaturated prepolymers under the influence particularly of UV-radiation are generally known.

Compositions containing such systems are employed on an industrial scale in coatings and in material for recording information, more particularly relief printing plates, in which latter case use is made of photopolymerizable synthetic resins. Other uses are clear paints, varnishes, paper coatings, printing inks, wood lacquers, pigmented films and the like.

In some fields of application there is a great need for more rapidly curing systems which are not subject to yellowing, have good storage stability and are physiologically unsuspect. The present invention provides an initiator system which satisfies the above requirements. The invention consists in that in an initiator system of the type indicated above there are incorporated:

(a) a compound of the formula:

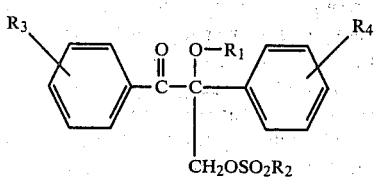

where $R_1$=H or a substituted or unsubstituted alkyl group having 1 to 18 carbon atoms, an alkenyl group having 2 to 18 carbon atoms, a cycloalkyl or cycloalkenyl group having 5 to 8 carbon atoms, a substituted or unsubstituted aryl group having 6 to 20 carbon atoms, a furfuryl group or the group

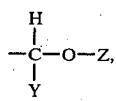

where Y represents a methyl group and Z an alkyl group having 2 to 4 carbon atoms or Y and Z together form a 1,3- or 1,4-alkylene group having 3 or 4 carbon atoms which is substituted or not with an alkoxy group having 1 to 4 carbon atoms; $R_2$=a substituted or unsubstituted alkyl group or alkenyl group having 4 to 20 carbon atoms, a cycloalkyl group or cycloalkenyl group having 5 to 8 carbon atoms, an alkaryl group having 4 to 16 carbon atoms in the alkyl group or a furfuryl group; $R_3$ and $R_4$ may be the same or different and represent a hydrogen, a chlorine or a bromine atom or a phenyl group, a substituted or unsubstituted alkyl group or alkoxy group having 1 to 4 carbon atoms, or a dialkyl amino group of which the alkyl groups have 1 to 4 carbon atoms and may be substituted or not with a hydroxyl group, and (b) a synergistic amount of a Na, K and/or Li-salt of an organic acid that is compatible with the curable compositions. U.S. application Ser. No. 246,423, filed Mar. 23, 1981 is directed to initiator systems which specifically exclude the photoinitiators required in this application.

Suitable substituents in the $R_1$, $R_2$, $R_3$ and $R_4$ groups in the formula for compound a are all those groups that have no unfavorable influence on the formation of radicals or on the properties of the radiation curable compositions. Suitable substituents are, for example, fluorine, chlorine, bromine or iodine, cyano, hydroxy, carboxyl and alkyl, alkenyl, cycloalkyl, aryl, alkoxy, cycloalkoxy, alkylthio, carboxylester, acyl, aroyl, alkyl or aryl sulphonyl groups or alkyl or aryl sulphinyl groups.

Good results are obtained if the organic acid used is a carboxylic acid, sulphonic acid, sulphinic acid, a partially esterified sulphuric or phosphoric acid, a phosphoric acid, phosphinic acid and/or an arylhydroxide.

It has been found that generally favourable results are obtained if use is made of an initiator system which per 1 to 10 parts of compound a contains 0,1 to 2 parts of compound b.

Under some circumstances it may be desirable for the initiator system according to the invention also to contain some amount of solvent c for component b. The amount of solvent to be incorporated into the initiator systems according to the invention is generally 20 to 80% by weight of the components a+b+c. The solvent may, of course, also be incorporated separately into the compositions to be cured or even form part thereof. In the latter case the amount of solvent may be a multiple of that of the components a+b. As a rule those solvents qualify for incorporation into the initiator system according to the invention that display some reasonable dissolving effect on component b and are compatible with the system to be cured. When use is to be made of a solvent which does not form part of the system to be cured, preference is given to water in view of its presenting no environmental problems. That solvent is incorporated into most resin systems in an amount of 2,5 to 6% by weight, preferably 3 to 5% by weight, together with about 1 to 10% by weight, preferably 2 to 6% by weight, of component a, calculated on the amount of composition to be cured. Of component b 0,1 to 5% by weight, and preferably 0,2 to 2% by weight is incorporated, calculated on the amount of composition to be cured.

Under some circumstances the presence of water is found to meet with insurmountable drawbacks. In such cases the invention permits employing as solvent an aliphatic alcohol having 1 to 8 carbon atoms. Examples are methanol, ethanol and n-octanol.

Alternatively, use may be made of a solvent which may be chemically bound as a result of the presence of an ethylenically unsaturated group such as allyl alcohol.

It has further been found that favourable results also may be obtained when as solvent a ketoxime, particularly dialkyl ketoxime, is employed. Especially methylethyl ketoxime has been found to be a very valuable solvent.

As far as compound a is concerned, special preference is given to compounds of the formula:

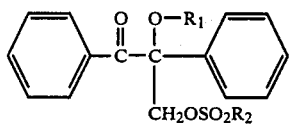

where R₁ is a hydrogen atom or a lower alkyl group and R₂ an alkyl group having 4 to 20 carbon atoms.

Very favourable results are found to be obtained especially with a compound of this last-mentioned formula where R₂ has the meaning of an alkyl group having 8 to 16 carbon atoms.

Favourable results are also found to be obtained with compounds of the last-mentioned structural formula where R₁ represents a hydrogen atom or a lower alkyl group and R₂ represents a group of the formula:

where R represents an alkyl group or alkoxy group having 8 to 13 carbon atoms.

Examples of salts of organic acids that may be used as compound b in the initiator systems of the present invention include, but are not limited to, potassium, sodium or lithium acetate, formiate, butyrate, valerate, 2-ethylhexanoate, laurate, stearate, versatate, caproate, trichloroacetate, sarcosate, benzoate, naphthoate, o-nitrobenzoate, adipate, dodecylbenzene sulphonate, cumene sulphonate, p-toluene sulphinate, butane sulphinate, cocnut fatty alcohol sulphate, sulph(on)ated glycerol trioleate, sulph(on)ated peanut oil, lauryl sulphate, di-(2-ethylhexyl)phosphate, ethyl octylphosphonate, p-nonylphenolate, di(n-octyl)sulphosuccinate, butane sulphonate, methane sulphonate, 2-naphtholate.

Good results are also obtained if use is made of a compound of the formula:

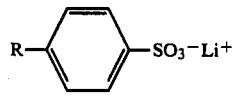

where R is a hydrogen atom or an alkyl group or alkoxy group having 1 to 14 carbon atoms. Especially when for R in the last-mentioned formula use is made of an alkyl group having 10 to 14 carbon atoms problems may arise from unduly low solubility in the compositions to be cured.

To that end the invention provides an initiator system in which for b a mixture of compounds is used with R representing different meanings.

Favourable results are further obtained with b being a compound corresponding to the formula

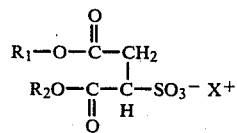

where X has the meaning of a Na, K or Li-ion and R₁ and R₂ represent a branched or non-branched aliphatic group having 4 to 12 carbon atoms. Particularly favourable results are obtained then when use is made of a compound of any one of the following structures:

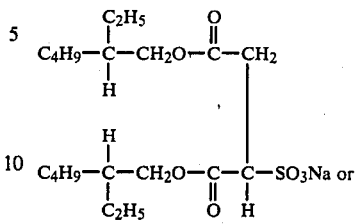

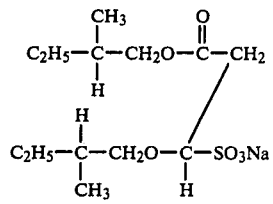

Especially the anionic surface active compounds of the sodium lauryl ether sulphate type having the formula $CH_3-(CH_2)_{10}-CH_2-O(CH_2CH_2O)_nSO_3^{\ominus}Na^{\oplus}$, where n is an integer from 2 to 14, are found to form a satisfactory component b in the initiator systems according to the invention. The initiator systems according to the present invention are particularly suitable to be employed in the photopolymerization of unsaturated compounds-containing polymerizable systems.

As suitable polymerizable systems may be mentioned all compounds of which the carbon-carbon double bonds are activated by, for instance, halogen atoms or carbonyl groups, carboxy groups, ester groups, amide groups, ether groups or aryl groups, and carbon-carbon double and carbon-carbon triple bonds. As examples may be mentioned: the acrylate, methacrylate, itaconate, cinnamate, or sorbate of an alkylene glycol, alkoxylene glycol, alicyclic glycol, and higher polyol such as ethylene glycol, triethylene glycol, tetraethylene glycol, tetramethylene glycol, pentanediol, trimethylolethane, pentaerythritol, sorbitol, diols of unsaturated fatty acids, and the like, or modified acrylates, methacrylates, and itaconates, acrylated, methacrylated, and itaconated prepolymers, e.g. epoxy resins, oil and oil-free alkyl resins, urethanes and linear polyesters.

Examples are hydroxyethyl acrylate, trimethylolpropane trimethacrylate, pentaerythritol triacrylate, polyethylene glycol diacrylate, polyethylene glycol dimethacrylate, pentaerythritol dimethacrylate, pentaerythritol diitaconate, ethylene glycol dimethacrylate, and methacrylated epoxy resin.

Part of the unsaturated acids may be replaced with saturated acids, such as succinic acid, glutaric acid, adipic acid, phthalic acid, tetrachlorophthalic acid or trimellitic acid. Alternative modifications include building in monovalent alcohols, such as butanol, hexanol and tetrahydrofurfuryl alcohol or monoprotic acids, such as benzoic acid, oleic acid, linseed oil fatty acid, ricinoleic acid, acrylic acid and methacrylic acid.

In addition to the initiator systems according to the invention the compositions to be cured may contain usual additives, such as tertiary amines (triethanolamine), phosphites (triphenyl phosphite, nonylphenyl phosphite), phosphines (triphenylphosphine), p-benzoquinone, hydroquinone, 3-methylpyrocatechol or copper compounds such as copper naphthenate. Optionally, polymerization catalysts, for instance peroxides in amounts of 0,1 to 4% by weight, may still be incorporated into the compositions to be cured.

In order to protect light-sensitive substrates, for instance light-coloured kinds of wood, a small amount of commonly used ultraviolet light absorbing agent may be added to the moulding or coating composition without the reactivity being considerably affected. Further photopolymerization may be carried out in the presence of small amounts of usual pigment, carrier and filler, and thixotropizing agents, such as glass fibres, synthetic fibres, silicic acid and talc.

The present invention also provides a process for the radiation curing of a photopolymerizable composition, in which process one of the above-mentioned compositions containing an initiator system according to the invention is exposed to radiation in a manner known in itself.

This radiation should have a wave length generally of from 200 to 500 nm in order for the component a of the initiator system to be brought into the activated state. As source of radiation there may be used sunlight or artificial light of which the emission is in the above-mentioned range. Suitable for use are, for example, mercury vapour, xenon and tungsten lamps. Also when exposed to ultraviolet and visible radiation from energy-poor fluorescent lamps having an emission of 300-580 nm, the compositions according to the invention will rapidly cure to practically colourless objects and coatings. The invention will be further described in, but not limited by the following examples.

EXAMPLE I

Photopolymerizable compositions were prepared consisting of 27% by weight of an epoxy diacrylate (average molecular weight 1050) and 73% by weight of polyethylene glycol diacrylate (molecular weight of polyethylene glycol 200). Into these compositions the following compounds were incorporated for component a in amounts of 1, 3 and 5% by weight, calculated on the compositions to be cured. With all these compounds $R_3 = R_4 = H$, and the meanings of $R_1$ and $R_2$ in the first-mentioned formula were varied as follows.

TABLE I

| Compound no. | $R_1$ | $R_2$ |
|---|---|---|
| 1 | H | $C_4H_9$ |
| 2 | H | $C_8H_{17}$ |
| 3 | H | $C_{12}H_{25}$ |
| 4 | H | $C_{16}H_{33}$ |
| 5 | H | —⟨ ⟩—$C_8H_{17}$ |
| 6 | H | —⟨ ⟩—$C_{13}H_{27}$ |
| 7 | $CH_3$ | $C_{16}H_{33}$ |
| 8 | $C_8H_{17}$ | $C_8H_{17}$ |
| 9 | $CH(CH_3)_2$ | $C_{16}H_{33}$ |

Component b was in all cases lithium tosylate in a concentration of 0,5% by weight, calculated on the compositions to be cured.

Each of the compositions was applied as clear paper lacquer in a coating thickness of 20 microns. The composition was cured with the aid of a Philips HOK 6 high-pressure mercury vapour lamp. The distance between the lamp and the coating applied to a moving belt was about 20 cm. The maximum speed was measured at which still a tack-free coating was obtained.

The measured speeds (m/minute) for the various compositions are given in the following table.

TABLE II

| Component a Compound No.: | Belt speed in m/minute at a concentration of component a in wt. % | | |
|---|---|---|---|
| | 1 | 3 | 5 |
| 1 | 2 | 20 | 20 |
| 2 | 2 | 36 | >40 |
| 3 | 2 | 32 | >40 |
| 4 | 2 | 42 | >50 |
| 5 | <2 | 26 | >40 |
| 6 | <2 | 24 | — |
| 7 | 2 | 32 | >40 |
| 8 | — | 20 | >38 |
| 9 | — | 32 | — |

For comparison component a in the same composition was replaced with 3% by weight of a commercially available photoinitiator known by the chemical name of benzildimethyl ketal. The measured speed was 10 m/minute. In the case where only lithium tosylate was incorporated, in an amount of 1% by weight, the speed of the belt was less than 2 m/minute. A speed of less than 2 m/minute was also measured in all cases where the concentration of component a was 3% by weight in the absence of any lithium tosylate.

EXAMPLE II

The procedure of Example I using component a in a concentration of 3% by weight was repeated in such a way that instead of lithium tosylate use was respectively of lithium butane sulphonate and lithium benzene sulphonate in amounts of 1% by weight, calculated on the amount of composition to be cured. In either case a belt speed in excess of 40 m/minute was measured.

EXAMPLE III

The procedure of Example I was repeated in such a way that for compound a the following compounds were employed:

TABLE III

| Compound No. | $R_1$ | $R_2$ | $R_3$ | $R_4$ |
|---|---|---|---|---|
| 10 | H | $C_8H_{17}$ | $CH_3$ | H |
| 11 | H | $C_{16}H_{33}$ | $CH_3$ | H |
| 12 | H | $C_8H_{17}$ | $CH_3$ | $CH_3$ |
| 13 | H | $C_{16}H_{33}$ | $CH_3$ | $CH_3$ |
| 14 | H | $C_8H_{17}$ | $OCH_3$ | H |
| 15 | H | $C_{16}H_{33}$ | $OCH_3$ | H |
| 16 | H | $C_8H_{17}$ | $OCH_3$ | $OCH_3$ |
| 17 | H | $C_{16}H_{33}$ | $OCH_3$ | $OCH_3$ |
| 18 | H | $C_{16}H_{33}$ | H | Cl |
| 19 | H | $C_8H_{17}$ | Cl | Cl |
| 20 | H | $C_{16}H_{33}$ | Cl | Cl |

In all cases the substituents $R_3$ and $R_4$ were in the para position.

The speeds measured for the various compositions are given in the table below.

TABLE IV

| Component a compound No. | Belt speed in m/minute at a concentration of component a in wt. % | |
|---|---|---|
| | 2 | 3 |
| 10 | 30 | >40 |
| 11 | >40 | >40 |
| 12 | 34 | |
| 13 | 56 | |
| 14 | 22 | |

TABLE IV-continued

| Component a compound No. | Belt speed in m/minute at a concentration of component a in wt. % | |
|---|---|---|
| | 2 | 3 |
| 15 | 36 | 48 |
| 16 | 36 | 54 |
| 17 | 40 | >60 |
| 18 | | >40 |
| 19 | 28 | |
| 20 | 56 | |

EXAMPLE IV

As photopolymerizable composition tetraethylene glycol diacrylate was used. The photoinitiator (component a) was compound No. 4 of Example I in an amount of 3% by weight, calculated on the amount of composition to be cured.

In each case the proportion of component b in the compositions was 1% by weight.

The speeds m/minute measured for the various compositions are given in the table below.

TABLE V

| component b | belt speed in m/minute |
|---|---|
| — | 2 |
| lithium tosylate | >40 |
| lithium butane sulphonate | >40 |
| $\begin{array}{c} \text{CH}_2\text{--}\overset{\overset{\displaystyle O}{\|}}{\text{C}}\text{--OCH}_2\text{--}\overset{\overset{\displaystyle C_2H_5}{\|}}{\underset{\underset{\displaystyle H}{\|}}{\text{C}}}\text{--C}_4\text{H}_9 \\ | \\ \text{NaSO}_3\text{--}\overset{\overset{\displaystyle H}{\|}}{\underset{\underset{\displaystyle H}{\|}}{\text{C}}}\text{--}\overset{\|}{\underset{\underset{\displaystyle O}{\|}}{\text{C}}}\text{--OCH}_2\text{--}\overset{\overset{\displaystyle H}{\|}}{\underset{\underset{\displaystyle C_2H_5}{\|}}{\text{C}}}\text{--C}_4\text{H}_9 \end{array}$ | 20 |
| $\begin{array}{c} \text{CH}_2\text{--}\overset{\overset{\displaystyle O}{\|}}{\text{C}}\text{--OCH}_2\text{--}\overset{\overset{\displaystyle CH_3}{\|}}{\underset{\underset{\displaystyle H}{\|}}{\text{C}}}\text{--C}_2\text{H}_5 \\ | \\ \text{NaSO}_3\text{--}\overset{\overset{\displaystyle H}{\|}}{\underset{\underset{\displaystyle H}{\|}}{\text{C}}}\text{--}\overset{\|}{\underset{\underset{\displaystyle O}{\|}}{\text{C}}}\text{--OCH}_2\text{--}\overset{\overset{\displaystyle H}{\|}}{\underset{\underset{\displaystyle CH_3}{\|}}{\text{C}}}\text{--C}_2\text{H}_5 \end{array}$ | 30 |
| $C_8H_{17}\text{--}\langle\bigcirc\rangle\text{--SO}_3^-\text{Li}^+$ | 2 |
| *R$\text{--}\langle\bigcirc\rangle\text{--SO}_3^-\text{Li}^+$ | >40 |

| *Mixture of compounds where R is: — | wt. % |
|---|---|
| CH$_3$(CH$_2$)$_9$ | 8 |
| CH$_3$(CH$_2$)$_{10}$ | 30-40 |
| CH$_3$(CH$_2$)$_{11}$ | 35-45 |
| CH$_3$(CH$_2$)$_{12}$ | 15-25 |
| CH$_3$(CH$_2$)$_{13}$ | 1 |

The above table clearly shows the synergistic effect of the presence of component b on the curing rate. The low curing rate in the case where use is made of lithium p-n-octylphenyl sulphonate must be attributed to the low solubility in the respective acrylate system. This solubility is very much increased by using a mixture of compounds with R having different meanings or by employing a solvent c, as is demonstrated in the following examples.

EXAMPLE V

A photopolymerizable composition was prepared made up of 27% by weight of an epoxy diacrylate (average molecular weight 1050) and 73% by weight of tetraethylene glycol diacrylate. Use being made of the same procedure as described in Example I, a coating was applied to a substrate and subsequently exposed to radiation.

The speeds measured for the various compositions are given in the table below.

TABLE VI

| Photoinitiator (3% by weight) | component b (1% by weight) | component c | |
|---|---|---|---|
| | | — belt speed | 5% by wt H$_2$O in m/min |
| the hexadecane sulphonic ester of α-hydroxymethyl benzoin | — | 2 | 2 |
| the hexadecane sulphonic ester of α-hydroxymethyl benzoin | lithium tosylate | 26 | >40 |
| the hexadecane sulphonic ester of α-hydroxymethyl benzoin | $C_{18}H_{17}\text{--}\langle\bigcirc\rangle\text{--SO}_3^-\text{Li}^+$ | 4 | >40 |
| the hexadecane sulphonic ester of α-hydroxymethyl benzoin | $C_8H_{17}SO_3^-\text{Li}^+$ | 2 | >40 |
| the hexadecane sulphonic ester of α-hydroxymethyl benzoin | lithium methane-sulphonate | — | >40 |

EXAMPLE VI

The test procedure of Example IV was repeated with the use of 3% by weight of the hexadecane sulphonic acid ester of α-hydroxymethyl benzoin and 1% by weight of sodium p-toluene sulphonate in the presence of 5% by weight of H$_2$O.

A curing rate of over 40 m/minute was measured.

A speed in excess of 40 m/minute was also measured upon employing 1% by weight of

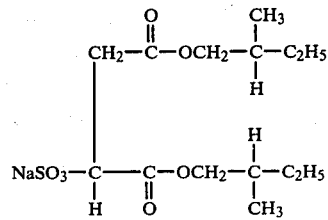

EXAMPLE VII

The procedure of Example IV was repeated in such a way that for component b use was made of 1% by weight of lithium octane sulphonate in each composition and for component c 5% by weight of methanol, n-octanol and methylethyl ketoxime, respectively, in 3 separate compositions. The speed of the belt was always over 40 m/minute.

EXAMPLE VIII

The procedure of Example V was repeated in such a way that for component b there were used various salts of carboxylic acids. The salt concentration was 1% by weight. The results are given in the table below.

TABLE VII

| component b + 5% by weight of H₂O | belt speed in m/minute |
|---|---|
| sodium benzoate | 58 |
| sodium stearate | 56 |
| lithium laurate | >60 |
| lithium 2-ethylhexanoate | 28 |
| lithium versatate | 56 |
| lithium naphthoate | >50 |
| lithium sarcosate | 30 |
| sodium sarcosate | 44 |
| lithium caproate | >40 |
| lithium trichloroacetate | >40 |
| lithium o-nitrobenzoate | >40 |
| lithium acetate | >40 |
| lithium benzoate | >40 |
| lithium valerate | >60 |
| lithium butyrate | >60 |
| lithium phenolate | >40 |
| lithium p-nonylphenolate | 36 |
| lithium salt of C₁₂H₂₅—(OC₂H₄)₂OCH₂COOH | >60 |
| lithium salt of C₁₂H₂₅—(OC₂H₄)₁₀OCH₂COOH | 26 |
| lithium salt of oleyl-(OC₂H₄)₂OCH₂COOH | >60 |
| lithium formate | >40 |

EXAMPLE IX

The procedure of Example V was repeated with the use, in the presence or not of water, of 1 to 2% by weight of various salts of sulphonic and sulphinic acids. The results are given in the table below.

TABLE VIII

| component b | belt speed in m/minute | |
|---|---|---|
| | 5% water | No water |
| Na—salt of dodecylbenzene sulphonic acid (1%) | 44 | 42 |
| Na—salt of di(2-ethylhexyl)ester of sulphosuccinic acid (2%) | >60 | 34 |
| Na—salt of di(isoamyl)ester of sulphosuccinic acid (2%) | >60 | 52 |
| Na—salt of dioctylester of sulphosuccinic acid (2%) | >60 | 30 |
| Na—salt of isopropylnaphthalene sulphonic acid (1%) | >60 | >60 |
| Na—salt of cumene sulphonic acid (2%) | >60 | — |
| Na—salt of p-toluene sulphinic acid (1%) | 38 | 12 |
| Li—salt of butane sulphinic acid (1%) | 22 | 32 |

EXAMPLE X

The procedure of Example V was repeated with the use of 1 or 2% by weight of various sulphates in the presence or not of 5% by weight of water. The results are given in the table below.

TABLE IX

| component b | belt speed in m/minute % by weight of water | |
|---|---|---|
| | 5 | 0 |
| Na—salt of coconut fatty alcohol sulphate (2%) | 42 | 36 |
| Na—salt of sulphated glycerol trioleate (2%) | 58 | 42 |
| Li—salt of sulphated peanut oil (2%) | 38 | 40 |
| Na—salt of CH₃(CH₂)₁₁—O(CH₂CH₂O)₃SO₃H (1%) | >60 | 48 |
| Na—salt of lauryl sulphate (1%) | >60 | <2 |
| Na—salt of butylmonoethyleneglycol sulphate (2%) | >60 | 48 |

EXAMPLE XI

The procedure of Example V was repeated with the use of 2% by weight of phosphates or phosphonates according to the following formulae:

Compound A:
the potassium salt of a mixture of the mono- and diester of

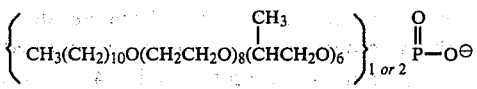

Compound B:
the potassium salt of a mixture of the mono- and diester of

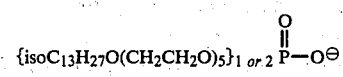

Compound C:
the potassium salt of a mixture of the mono- and diester of 2-ethylhexylphosphate.

Compound D:
potassium ethyl octylphosphonate.

The experiments were carried out in the presence or not of 5% water. The results are given in the table below.

TABLE X

| component b | belt speed in m/minute % by weight of water | |
|---|---|---|
| | 5 | 0 |
| A | 34 | 32 |
| B | 50 | 46 |
| C | 30 | 16 |
| D | 40 | 12 |

We claim:

1. An initiator system for radiation curable compositions, comprising (a) a compound of the formula:

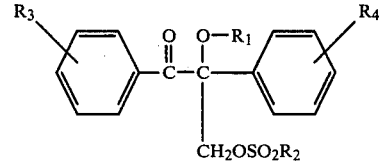

where R₁=H or a substituted or unsubstituted alkyl group having 1 to 18 carbon atoms, an alkenyl group having 2 to 18 carbon atoms, a cycloalkyl or cycloalkenyl group having 5 to 8 carbon atoms, a substituted or unsubstituted aryl group having 6 to 20 carbon atoms, a furfuryl group or the group

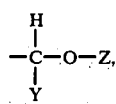

where Y represents a methyl group and Z an alkyl group having 2 to 4 carbon atoms or Y and Z together form a 1,3- or 1,4-alkylene group having 3 or 4 carbon atoms which is substituted or not with an alkoxy group having 1 to 4 carbon atoms; $R_2$=a substituted or unsubstituted alkyl group or alkenyl group having 4 to 20 carbon atoms, a cycloalkyl group or cycloalkenyl group having 5 to 8 carbon atoms, an alkaryl group having 4 to 16 carbon atoms in the alkyl group or a furfuryl group; $R_3$ and $R_4$ may be the same or different and represent a hydrogen, a chlorine or a bromine atom or a phenyl group, a substituted or unsubstituted alkyl group or alkoxy group having 1 to 4 carbon atoms, or a dialkyl amino group of which the alkyl groups have 1 to 4 carbon atoms and may be substituted with a hydroxyl group, and (b) a synergistic amount of a Na, K and/or Li-salt of an organic acid that is compatible with the curable compositions.

2. An initiator system according to claim 1, characterized in that the acid is at least one of a carboxylic acid, sulphonic acid, sulphinic acid, a partially esterified sulphuric or phosphoric acid, a phosphonic acid, phosphinic acid, and an arylhydroxide.

3. An initiator system according to claim 1 or 2, characterized in that per 1 to 10 parts of compound a it contains 0,1 to 2 parts of compound b.

4. An initiator system according to claim 1, characterized in that it contains some amount of solvent c for component b.

5. An initiator system according to claim 4, characterized in that the amount of solvent is 20 to 80% by weight of the components a+b+c.

6. An initiator system according to claim 4 or 5, characterized in that the solvent used is water.

7. An initiator system according to claim 4 or 5, characterized in that the solvent is an aliphatic alcohol having 1 to 8 carbon atoms.

8. An initiator system according to claim 1, characterized in that compound a corresponds to the formula:

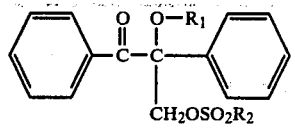

where $R_1$ is a hydrogen atom or a lower alkyl group and $R_2$ is an alkyl group having 4 to 20 carbon atoms.

9. An initiator system according to claim 8, characterized in that $R_2$ represents an alkyl group having 8 to 16 carbon atoms.

10. An initiator system according to claim 1, characterized in that compound a corresponds to the formula:

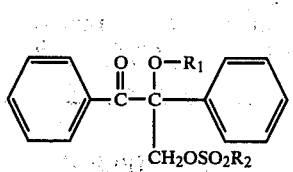

where $R_1$ represents a hydrogen atom or a lower alkyl group and $R_2$ represents a group of the formula

where R represents an alkyl group or alkoxy group having 8 to 13 carbon atoms.

* * * * *